(12) United States Patent
Jeschke et al.

(10) Patent No.: US 11,010,509 B2
(45) Date of Patent: May 18, 2021

(54) SYSTEMS AND METHODS FOR COMPUTER SIMULATION OF DETAILED WAVES FOR LARGE-SCALE WATER SIMULATION

(71) Applicant: Nvidia Corporation, Santa Clara, CA (US)

(72) Inventors: Stefan Jeschke, Vienna (AT); Matthias Mueller-Fischer, Uerikon (AT); Nuttapong Chentanez, Zurich (CH); Miles Macklin, Auckland (NZ)

(73) Assignee: NVIDIA Corporation, Santa Clara, CA (US)

( * ) Notice: Subject to any disclaimer, the term of this patent is extended or adjusted under 35 U.S.C. 154(b) by 333 days.

(21) Appl. No.: 16/107,902

(22) Filed: Aug. 21, 2018

(65) Prior Publication Data

US 2019/0362035 A1    Nov. 28, 2019

Related U.S. Application Data

(60) Provisional application No. 62/675,704, filed on May 23, 2018.

(51) Int. Cl.
*G06F 30/20* (2020.01)
*G06T 13/60* (2011.01)
(Continued)

(52) U.S. Cl.
CPC .............. *G06F 30/20* (2020.01); *G06T 13/60* (2013.01); *G06F 2111/10* (2020.01); *G06T 13/20* (2013.01)

(58) Field of Classification Search
CPC ......... G06F 30/20; G06T 15/06; G06T 13/60; H04S 7/306; G01N 24/08; G01R 33/56
(Continued)

(56) References Cited

U.S. PATENT DOCUMENTS 7,164,424 B2   1/2007  Liang et al.
8,232,999 B2   7/2012  Gornowicz
(Continued)

FOREIGN PATENT DOCUMENTS

CN   101930622   3/2012
CN   107545096   3/2012
(Continued)

OTHER PUBLICATIONS

Vladimir Belyaev, Real-time simulation of water surface, Applied Math. Department, St. Petersburg State Polytechnical University, St. Petersburg, Russia, International Conference Graphicon 2003, Moscow, Russia, http://www.graphicon.ru/, 8 pages.
(Continued)

*Primary Examiner* — Thai Q Phan
(74) *Attorney, Agent, or Firm* — Shook, Hardy & Bacon, L.L.P.

(57) ABSTRACT

Embodiments of the present invention provide a novel method and discretization for animating water waves. The approaches disclosed combine the flexibility of a numerical approach to wave simulation with the stability and visual detail provided by a spectrum-based approach to provide Eulerian methods for simulating large-scale oceans with highly detailed wave features. A graphics processing unit stores a one-dimensional texture referred to as a wave profile buffer that stores pre-computed results at a number of discrete sample points for performing wave height evaluation. The water surface is rendered according to water height values computed using the wave profile, accounting for advection, spatial diffusion, angular diffusion, boundary reflections, and dissipation.

22 Claims, 15 Drawing Sheets

(51) Int. Cl.
*G06T 19/00* (2011.01)
*G06T 13/20* (2011.01)
*G06F 111/10* (2020.01)

(58) Field of Classification Search
USPC .................................................. 703/2, 5, 6
See application file for complete search history.

(56) References Cited

U.S. PATENT DOCUMENTS

| | | | |
|---|---|---|---|
| 9,811,941 | B1 | 11/2017 | Hankins et al. |
| 9,995,812 | B2 * | 6/2018 | Topgaard ................ G01N 24/08 |
| 10,073,026 | B2 * | 9/2018 | Curry .................... G02B 17/004 |
| 10,649,057 | B2 * | 5/2020 | Topgaard ................ G01R 33/56 |
| 2007/0026544 | A1 * | 2/2007 | Tsuno ..................... G06F 30/20 |
| | | | 438/14 |
| 2013/0236040 | A1 * | 9/2013 | Crawford ................ H04S 7/306 |
| | | | 381/310 |
| 2015/0378019 | A1 * | 12/2015 | Schissler ................. G06T 15/06 |
| | | | 700/94 |
| 2018/0012392 | A1 | 1/2018 | Kryachko |

FOREIGN PATENT DOCUMENTS

| | | |
|---|---|---|
| CN | 103700143 | 4/2014 |
| CN | 102592297 | 1/2015 |

OTHER PUBLICATIONS

Daniel Gritzner, Simulation of Liquid Surfaces for Games, Bachelor's Thesisby Daniel Gritzner from Worms, Aug. 2010, 39 pages.
Hinsinger, D., Neyret, F., & Cani, M. P. (Jul. 2002). Interactive animation of ocean waves. In Proceedings of the 2002 ACM SIGGRAPH/Eurographics symposium on Computer animation (pp. 161-166).
Tessendorf, J. (2001). Simulating ocean water. Simulating nature: realistic and interactive techniques. SIGGRAPH, 1 (2), 5.

* cited by examiner

SYSTEMS AND METHODS FOR COMPUTER SIMULATION OF DETAILED WAVES FOR LARGE-SCALE WATER SIMULATION

CROSS-REFERENCE TO RELATED APPLICATIONS

This application claims the benefit of and priority to provisional patent application, Ser. No. 62/675,704, entitled "SYSTEMS AND METHODS FOR COMPUTER SIMULATION OF DETAILED WAVES FOR LARGE-SCALE WATER SIMULATION," filed on May 23, 2018, and hereby incorporated by reference in its entirety.

FIELD

Embodiments of the present invention generally relate to the field of computer graphics simulation. More specifically, embodiments of the present invention relate to systems and methods for providing better, more realistic, appearances of natural environments rendered by computer simulation for large-scale simulations.

BACKGROUND

There is a growing need in the field of computer graphics to quickly render large-scale interactive natural scene simulations, e.g., of the ocean, with a high degree of detail to provide better, more realistic, appearances. The problem involves generating interactive, very large scale ocean simulations, e.g., several square kilometers in simulation size, having practically unlimited ocean details. For example, the simulated waves should disperse and reflect off and diffract around boundaries and shores and should interact with many objects, e.g., ships, boats, etc., and the simulation should provide at least 30 frames/second for interactivity. Simulating large bodies of water in real-time has been a research goal for a few decades.

Existing approaches to computer simulation of large bodies of water include procedural approaches, such as Fourier-based methods, that typically lack the ability to dynamically respond to complex environmental interactions such as moving boundaries and spatially-varying wind. On the other hand, spectrum-based approaches to wave simulation employ numerous theoretical assumptions in order to reduce overall complexity, such as assuming deep water, potential flows, small amplitudes, and periodic boundary conditions to discretize the Fourier transformations. However, spectrum-based approaches are generally unable to realistically interact with complex boundaries and environmental conditions, such as shorelines, floating objects, and boats. For example, spectrum-based methods have difficulties simulating obstacle interactions because their derivation assumes periodic boundaries. Other existing computer simulation approaches, such as Eulerian wave simulations, are numerical solutions that require very high memory consumption to implement an adequate grid size for large scenes (e.g., several square kilometers).

Numerical approaches that solve Navier-Stokes equations for water simulation excel at handling water interactions with moving obstacles, but are prohibitively expensive to compute when scaling to very large scale simulation domains with small (e.g., high frequency) wave details. These methods tend to be more flexible than spectrum based methods because they make minimal assumptions about the surrounding environment. Furthermore, these methods involve simulating wave propagation by iterating local kernel operations instead of merely inserting time parameters into a cosine function. Rather, these methods rely on discretized wave heights and momentum applied directly on an Eulerian grid or mesh, and therefore, the resolution of the grid or mesh is directly constrained by the amount of visible wave detail. Specifically, Nyquist's theorem requires that the grid or mesh be fine enough to resolve the highest frequency in the height field to prevent aliasing and instability of the simulation.

Yet other approaches, such as dynamic Lagrangian simulations, rely on wave particle simulations that suffer from potentially prohibitive particle counts, making these approaches poorly suited for real-time large-scale interactive ocean simulations.

Furthermore, previous methods for simulating two dimensional (2D) water waves directly compute the changes in water surface height, and this imposes limitations based on the Courant-Friedrichs-Lewy (CFL) condition, thereby establishing a maximum simulation time step size for simulating fast-moving waves. These methods are further restricted by Nyquist's limit, which mandates that small wave details require closely-spaced simulation variables.

Accordingly, what is needed is a technique and solution for large-scale interactive ocean simulations that dynamically responds to objects and boundaries while also providing a high level of ocean detail at a relatively high frame rate, but without consuming a great deal of computer memory resources.

SUMMARY OF THE INVENTION

According to embodiments of the present invention, a water surface may be simulated according to wave water amplitude values stored in a simulation grid, and wave profiles precomputed and stored in a profile buffer. The profile buffer may be a one-dimensional texture used to increase the performance of wave/water height evaluation within the computer simulation. The fluid surface may then be rendered according to the simulated wave amplitude values and the precomputed wave profiles.

Embodiments of the present invention provide a novel method and system for discretization pertaining to water wave animation. The approaches disclosed herein combine flexibility characteristics of a numerical approach to wave simulation with the stability and visual detail characteristics provided by a spectrum-based approach to provide Eulerian methods for computer simulating large-scale ocean environments with highly detailed wave features. A simulation grid is used to simulate and store water amplitudes values, and a graphics processing unit generates a one-dimensional texture referred to as a wave profile buffer that stores precomputed water height values. The water surface is then rendered according to the precomputed height values in the wave profile buffer and the water amplitude values stored in the simulation grid, accounting for advection, spatial diffusion, angular diffusion, boundary reflections, and dissipation.

Embodiments of the present invention couple a coarse (Eulerian) wave energy simulation with a special up-resolution technique to model the actual waves in the computer simulation. In one example, the method is performed on a coarse spatial grid with roughly one meter grid spacing (in one embodiment). Embodiments simulate (directional) wave energy, including boundary reflections and diffraction. The up-resolution technique uses this coarse directional data to locally and directionally attenuate waves. Embodiments use a very fast method for superimposing thousands of directional waves at any spatial location. A novel technique utilizes time steps to compute a 1D texture that contains a spatial "profile" of all summed waves. This profile is then reused to compute the sum over all directions, which reduces the double sum (over all wavelengths and over all directions) to a single sum over all directions, e.g., replacing the inner sum by a single 1D profile texture read. This allows realization of practically unlimited small wave details at real-time frame rates and further allows reproduction of plausible deep water wave dispersion. In one embodiment, the procedure is operable on a graphics processor unit (GPU).

According to one embodiment, a method of computer implemented simulation of waves of a fluid is disclosed. The method includes storing wave amplitude values in a simulation grid, computing wave advection in a plurality of directions according to a wavevector angle, computing wave diffusion between neighboring directions of the plurality of directions, computing boundary reflection at a solid boundary of the simulation grid, updating the wave amplitude values stored in the simulation grid, precomputing wave profiles at a plurality of discrete sample points, storing the wave profiles in a wave profile buffer, computing water height values at vertices of a visualization mesh using the wave profile buffer, and rendering a water surface represented by the coarse simulation grid in a single shader pass using the wave amplitude values stored in the simulation grid and one dimensional water height values in the wave profile buffer.

According to another embodiment, a method of computer implemented simulation of a fluid includes precomputing wave profiles for the plurality of waves by evaluating a water height function at a plurality of discrete sample points to generate precomputed wave profiles, wherein the fluid comprises a plurality of waves in motion, storing the precomputed wave profiles in a one-dimensional texture in computer memory, computing water height values for the fluid using the wave profiles, and rendering a frame comprising a surface of the fluid, the rendering performed using the water height values, wherein the computing, the precomputing, the storing and the rendering are performed by a computer system executing a simulation program.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1A:
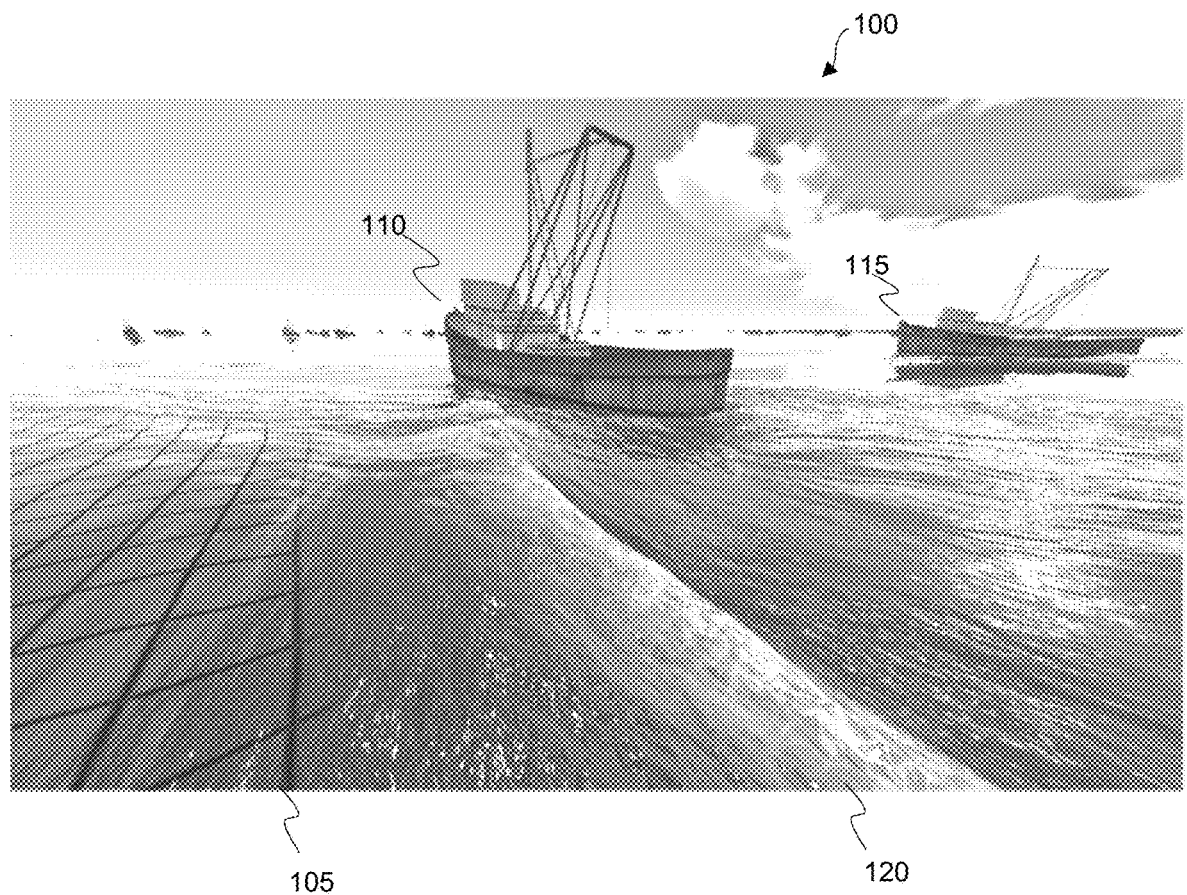
FIG. 1A is an image of an exemplary computer animated scene of a large-scale water simulation according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIGS. 11 and 12) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "rendering," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Systems and Methods for Computer Simulation of Detailed Waves for Large-Scale Water Simulation Embodiments of the present invention provide systems and methods for a novel wavelet-based discretization for computer animation of natural environments, e.g., water waves, or generally, waves of a fluid. The disclosed computer procedures and techniques utilized herein combine the flexibility of a numerical approach to wave simulation with the stability and visual detail provided by a spectrum-based approach to advantageously provide Eulerian methods for computer simulating large-scale oceans with highly detailed wave features.

In general, embodiments of the present invention couple a coarse Eulerian wave energy simulation with a special up-resolution technique to model the actual waves in the computer simulation. In one example, the coarse spatial grid has roughly 1 meter grid spacing (in one embodiment). Embodiments simulate (directional) wave energy, including boundary reflections and diffraction. The up-resolution technique uses this coarse directional data to locally and directionally attenuate waves. Embodiments use a very fast method for superimposing thousands of directional waves at any spatial location. A novel technique utilizes time steps to compute 1D texture that contains a spatial "profile" of all summed waves. This profile is then reused to compute the sum over all directions, which reduces the double sum (over all wavelengths and over all directions) to a single sum over all directions, e.g., replacing the inner sum by a single 1D profile texture read. This allows realization of practically unlimited small wave details at real-time frame rates and further allows reproduction of plausible deep water wave dispersion. In one embodiment, the procedure is operable on a graphics processor unit (GPU).

As depicted in the exemplary animated scene 100 of FIG. 1, the disclosed methods and systems generate theoretically accurate wave speeds for surface waves (e.g., wave 120) while handling complex interactions with obstacles (e.g., boats 110 and 115) and boundaries. The described embodiments avoid the complications attributed to traditional spectrum-based approaches by employing a chain of wave components that are able to interact with obstacles. This approach advantageously de-couples the resolution of the visualized waves from the resolution of the simulation. Further, the resolution of the simulation grid 105 (visible on the left of the image) can be much lower than the resolution of the heightfield which is ultimately visualized, and can advantageously animate very high frequency waves without the complications relating to excessive computation, aliasing, or simulation stability inherent with other approaches.

Moreover, to increase the performance of wave amplitude evaluation within the computer simulation, a profile buffer is used to store a one-dimensional texture including precomputed results of an amplitude function evaluated at a number of discrete sample points at the beginning of each time step. The disclosed method is capable of being fully performed by a graphics processing unit (GPU) of a computer system in one embodiment. The computational complexity of the disclosed method advantageously does not vary according to a number of required particles as in Lagrangian approaches, and easily interfaces with texture maps for simply providing a measure of artistic control of the waves (e.g., directional amplitude).

One feature of the embodiments of the present invention is to update wave amplitudes A and use the updated wave amplitude values to visualize the water height $\eta$. Common (Eulerian) wave simulations operate on wave height, elevation, and displacement $\eta$. However, a major aspect of the physics simulation described herein involves the computation of the wave amplitudes A, where the values of A are not directly visualized. Conversely, the computation of $\eta$ is relatively reduced in complexity due to the use of a precomputed profile buffer, and the visualization of the water height $\eta$ is substantially responsible for the visual detail of the wave simulation. Therefore, within embodiments of the present invention, A is computed on a relatively coarse grid (e.g., one meter grid spacing), and $\eta$ is computed on a viewer-dependent adaptively refined detailed mesh, thereby allowing the simulation of extremely small wave details. Specifically, a GPU-implemented embodiment performs hardware tessellation to compute an adaptive triangle mesh with vertex positions determined by $\eta$, and computes the surface normals in a pixel shader using analytic spatial derivatives of $\eta$, in this embodiment.

Embodiments of the present invention provide a procedure for computing water height using a function, TimeStep, that performs pre-computation once every time step of the simulation, and a function, WaterHeight, that is computed on-demand for each node of the finely sampled mesh and for each pixel. The TimeStep function includes an Advection-Step function, which computes semi-Lagrangian advection, and a WavevectorDiffusion function, which computes amplitude spreading. The TimeStep function also includes a PrecomputeProfile function that precomputes the one dimensional water wave profile buffers $\psi c(p, t)$ used for water height evaluation.

As depicted in pseudocode Table I below, the WaterHeight function numerically evaluates mesh vertices with a weighted sum of one-dimensional wave profiles at different angles. Waves can be suppressed or dampened by adjusting the weight assigned to specific directions. For example, it may be advantageous to suppress waves traveling parallel to a shoreline so that only the approaching and bouncing waves remain. Because suppressing wave directions reduces the overall energy, the final displacements may be normalized using a sum of all weights. Within embodiments of the present invention, artistic control tools may also be used to adjust the direction and amplitude of waves. Accordingly, embodiments of the preset invention provide steerable interactive waves that respond to collisions with objects and manual overriding of direction and amplitude values.

TABLE I

Algorithm 1 Pseudocode

```
 1: function TIMESTEP(t)
 2:    AdvectionStep(t)
 3:    WavevectorDiffusion(t)
 4:    Ψ ← PrecomputeProfileBuffers(t)
 5: end function
 6: function WATERHEIGHT(x, t)
 7:    η ← 0
 8:    for b ← 1, Θ_η do
 9:        
```
$$\theta_b \leftarrow \frac{2\pi}{\Theta_\eta}b$$
```
10:        k̂ ← (cos θ_b, sin θ_b)
11:        p ← k̂ · x + rand(b)
12:        for c ← 1, K_η do
13:            η ← η + 𝒜(s,k,k̂) * Ψ_c(p, t)
14:        end for
15:    end for
16: end function
```

Embodiments of the disclosed method for rendering large scale waves perform a hybrid simulation that includes aspects of spectrum-based methods and aspects of partial differential equations (PDE) based methods. For example, the overall method resembles a spectrum-based procedure within a single grid cell, and resembles a PDE-based discretization when taken at a larger scale. Amplitude function A(x, k, t) is a function in 4+1 dimensions, including two dimensions in space, two dimensions in wavevector, and one dimension in time. The function can conveniently be represented in polar coordinates k=(k cos ϑ, k sin ϑ), where k is the magnitude of k, and ϑ is the angle between k and the x-axis.

Water Surface Computer Simulation—Exemplary Implementation

Figure 1B:
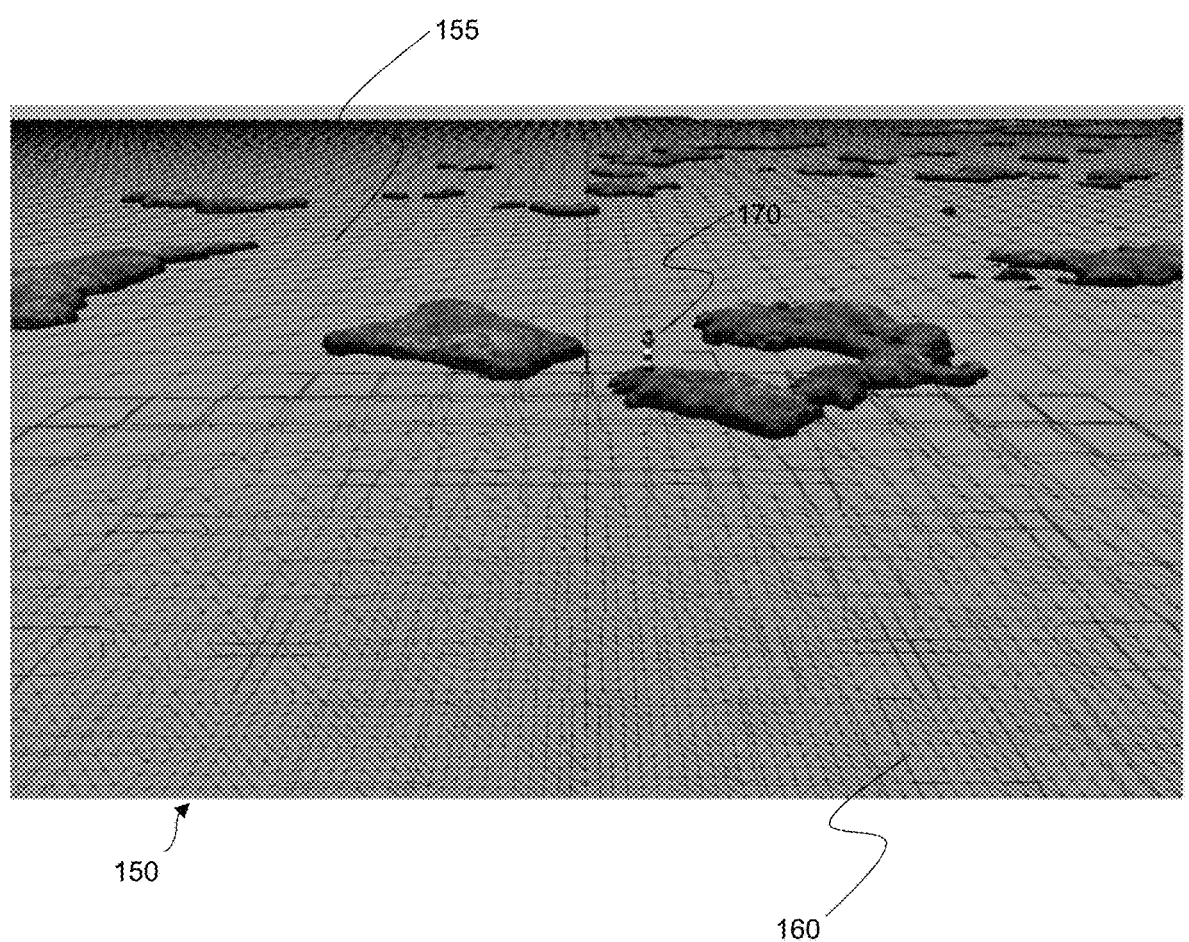
FIG. 1B is a diagram of an exemplary rendering mesh for performing large-scale water computer simulation according to embodiments of the present invention.

Embodiments of the water surface computer simulation may be executed by a GPU of a computing device. In one exemplary embodiment, the entire water surface may be rendered in a single DirectX 11 shader pass, but this is merely an example of one such commercially available shader design. As illustrated in FIG. 1B, an exemplary 4 km×4 km water surface 155 of animated scene 150 is used to render a water surface as a set of $128^2$ quad patches or meshes. Starting at the lighthouse 170, the patches are dynamically retessellated with increasing viewer proximity using the GPU tessellation unit. Specifically, patches close to the viewpoint (e.g., patch 160) are dynamically subdivided by the GPU tessellation unit using the continuous fractional odd tessellation scheme and the highest tessellation factor of 64 is applied. Patches beyond the lighthouse (e.g., patch 155) are not tessellated. In the domain shader, a "conservative" view frustum is constructed that is slightly wider than the output view frustum. Only vertices covered by this conservative frustum are displaced. This technique avoids displacing all patch vertices in every frame, which can be unnecessarily costly in terms of compute resources.

After rasterizing the tessellated and displaced mesh, a normal for each rasterized pixel is computed by the pixel shader. With the computed normal and position, shading is applied, such as a Fresnel term, an environment reflection, a refraction, etc. Finally, anti-aliasing (e.g., 2×MSAA hardware anti-aliasing) can be applied to the results.

Figure 2:
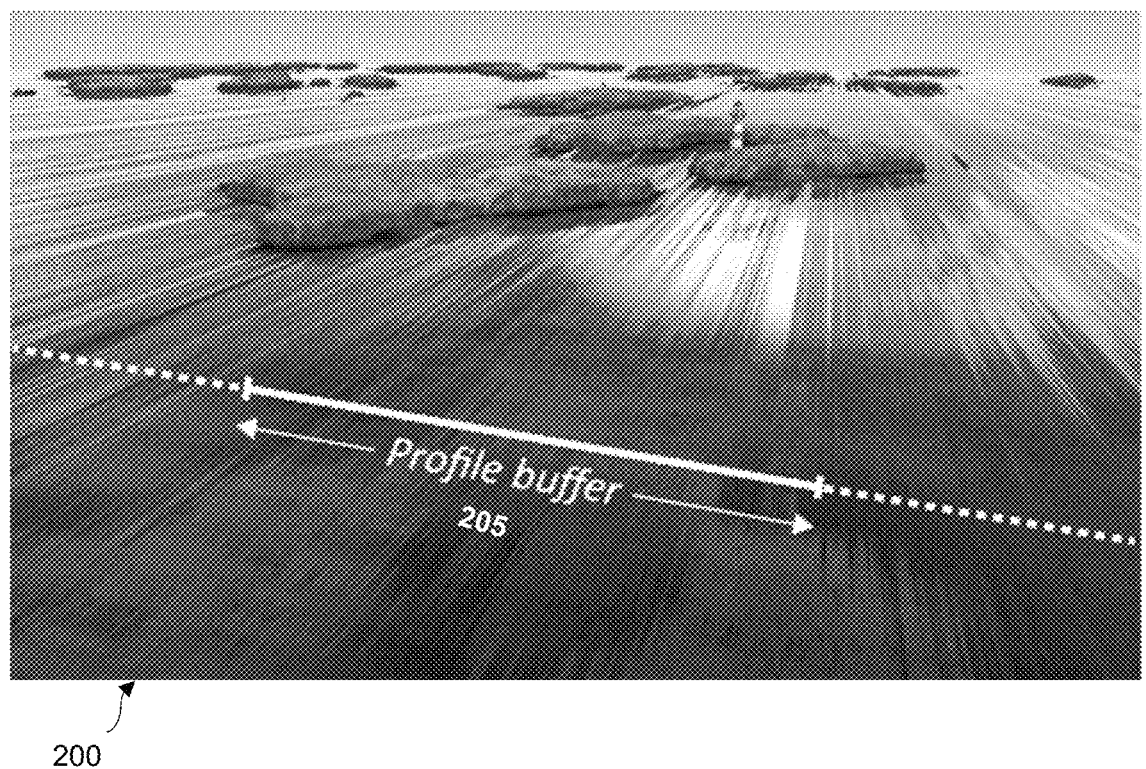
FIG. 2 is an image depicting an exemplary profile buffer aligned for a single wave direction in an animated scene of a large-scale water computer simulation depicted according to embodiments of the present invention.

With regard to FIG. 2, an exemplary profile buffer 205 is shown and aligned for a single wave direction in an animated scene 200 which is depicted in accordance with embodiments of the present invention. A profile buffer, in one embodiment, is a one-dimensional, two-component 16-bit texture that stores vertical and horizontal Gerstner wave displacements and computed in a simple pixel shader for each time step. Of course, the 16-bit data width is merely exemplary. The use of profile buffers enables accelerating the rendering speed by more than two orders of magnitude. In addition, profile buffer mipmapping provides a convenient way for anti-aliasing the water surface at a distance.

In particular, FIG. 2 illustrates a profile buffer alignment for a single wave direction $\Theta_\eta$. In accordance with embodiments of the present invention, when evaluating the water surface at a particular position, the position is projected onto the profile alignment and the corresponding texture buffer entry is sampled using texture coordinate wrapping, bilinear filtering, and mipmapping. The profile buffer can be constructed to be periodic so that it tiles seamlessly over all of space. Accordingly, the left and right world space extensions are smoothly blended using cubic polynomials. Specifically, if D is the physical profile buffer extent in world space units, and $$s = \frac{p}{D} \in [0, 1)$$

is the 1D texture coordinate of the corresponding world space position p, the final profile buffer value v is computed as:

$$v(s, t) = \frac{1}{2}(\Psi_c(p, t) + h_{00}\Psi_c(p + D, t) + h_{01}\Psi_c(p - D, t))$$

where $h_{00}=2 s^3-3 s^2+1$ and $h_{01}=-2 s^3+3 s^2$. The world space profile size D should be selected to be at least two times the size of the largest wavelength $\lambda_{max}$. A profile buffer resolution, e.g., res≥D/(2$\lambda_{min}$), maintains the Nyquist limit, meaning that even the shortest waves will receive at least two samples per wavelength $\lambda_{min}$. Instead of computing an individual profile buffer for each direction, which would increase texture storage and lookup costs, embodiments of the present invention utilize a single profile buffer that may be used for all directions. When evaluating a vertex position using the wave profiles, the profile may be shifted randomly and/or scaled slightly for each direction to avoid repetition and visual artifacts.

The corresponding normals are computed in parallel to the wave displacements in a separate profile buffer. In accordance with various implementations, two approximations may be used to speed up the normal computation time considerably without compromising appreciable visual fidelity. Firstly, the analytic derivative may be computed only for the vertical displacement, and the horizontal displacement may be neglected. Secondly, the surface normal may be computed as the derivative of the displacement function, which is a multiplication of $\psi_c(p, t)$ (stored in the profile buffer), with the amplitude coefficient $A_{abc}$ (stored in the simulation grid). In effect, for a single direction this can be expressed as:

$$(\mathcal{A}_{abc}\Psi_c(p,t))' = \mathcal{A}'_{abc}\Psi_c(p,t) + \mathcal{A}_{abc}\Psi_c(p,t)'$$

For efficiency reasons, the first term above may be neglected, and $A_{abc}$ may be multiplied by the precomputed $\psi_c(p, t)'$ instead. The introduced error is relatively small because $A_{abc}$ is spatially smooth, implying that $A'_{abc}$ is close to zero. An interesting side effect is that bilinear hardware interpolation is sufficient when sampling $A_{abc}$. Including the first term instead would require an expensive $C^1$ continuous cubic interpolation to avoid visible $C^0$ discontinuity artifacts in highlights on the water surface.

Embodiments Simulating High-Frequency Wave Functions and Complex Environmental Interaction Using DirectX 11

Embodiments of the present invention are described to follow in accordance with particular examples using specified hardware and data formats. Of course, these examples are presented herewith for a better understanding of the aspects of the present invention and any references to any particular hardware or data formats are merely exemplary and are not intended to be limiting of the scope of the present invention.

As described in greater detail below, according to some exemplary embodiments of the present invention, the amplitude simulation employs $\Theta_A=16$ directions for the wavevector angle $\vartheta$. The simulation values for these directions may be stored in four different four-component textures at 4096× 4096 resolution, each texture having 16-bits per channel. To initialize new waves from dynamic objects, an adequately-sized quad or patch is rendered on each of the 4 aforementioned simulation textures. The affected texels are either overwritten in the case of large objects, such as boats, or they are added to the existing simulation data in the case of smaller objects, such as barrels, jet skis, etc., in accordance with the wave painting tool described below.

The exemplary DirectX 11 implementation described herein uses a simulation step for updating A in a single pixel shader pass acting on the textures described above. The simulation step includes four main components:
1. Advection and spatial diffusion
2. Angular diffusion
3. Boundary reflections
4. Dissipation Each of these simulation components are described in more detail in the sections that follow. This section describes these components according to an exemplary DirectX 11 implementation of embodiments of the present invention. Of course, other well-known shader types could be used to implement embodiments of the present invention.

Figure 3:
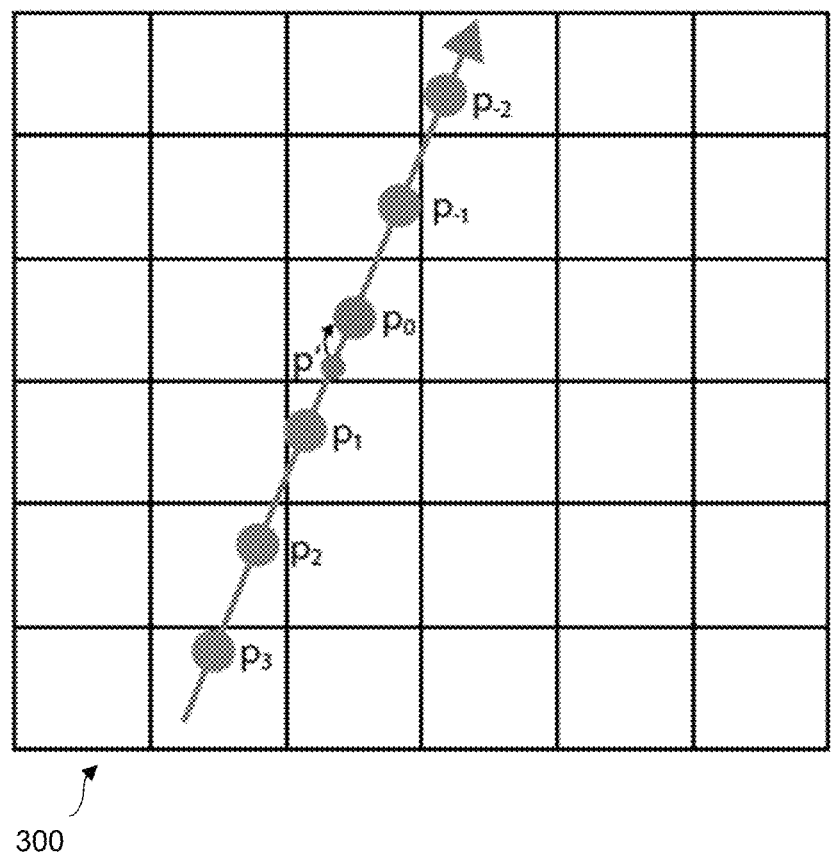
FIG. 3 is a diagram depicting an exemplary grid for advecting wave amplitudes in the direction of the arrow at an exemplary grid cell according to embodiments of the present invention.

To calculate advection according to the exemplary DirectX 11 implementation described herein, each direction is advected in the direction of its corresponding wavevector angle $\vartheta$. FIG. 3 depicts an exemplary simulation grid 300 for evaluating a wave advected in the direction of the arrow at an exemplary grid cell $p_0$ according to embodiments of the present invention. The grid may be realized as a computer data structure stored in memory. Semi-Lagrangian advection is performed, as well as spatial diffusion in one dimension in the direction of $\vartheta$. For example, for the spatial location $p_0$, the simulation grid 300 depicts the advection direction indicated by the illustrated arrow. Values $v_{-2} \ldots v_3$ around $p_0$ at the pixel-spaced positions $p_{-2} \ldots p_3$ along the advection direction are calculated using hardware texture sampling with bilinear filtering in this embodiment. To model wave packet stretching due to dispersion, the values $v_{-1} \ldots v_2$ are updated by a diffusion operator using the adjacent samples $v_{x-1}$, $v_{x+1}$ for each $v_x$ as follows:

$$\tilde{v}_x = \left(1 - 2\delta\frac{\Delta t}{(\Delta x)^2}\right)v_x + \delta\frac{\Delta t}{(\Delta x)^2}(v_{x-1} + v_{x+1})$$

where $\delta$ is the diffusion coefficient (described in greater detail in the following sections). For the actual semi-Lagrangian advection step, a Catmull-Rom spline is defined using the four diffused values $\tilde{v}_{-1}, \ldots, \tilde{v}_2$, and evaluated at position p'. Herein, p' is defined by the advection velocity and the time step size as described in greater detail below. The value at $p_0$ is updated with this value after clamping it between $\min(\tilde{v}_0, \tilde{v}_1)$ and $\max(\tilde{v}_0, \tilde{v}_1)$. This process may be applied in parallel for all directions and simulation grid cells.

In accordance with embodiments of the present invention, a small amount of angular diffusion is performed between neighboring directions within each grid cell to ensure wavefront connectivity. A grid cell stores 16 directional samples $s_d$ ($d \in \{0, \ldots, 15\}$), which are updated to $\tilde{s}_d$ as:

$$\tilde{s}_d = \left(1 - 2\gamma\frac{\Delta t}{(\Delta \theta)^2}\right)s_d + \gamma\frac{\Delta t}{(\Delta \theta)^2}(s_{d-1} + s_{d+1})$$

where $\gamma$ is the angular diffusion coefficient as detailed in the sections that follow.

Figure 4:
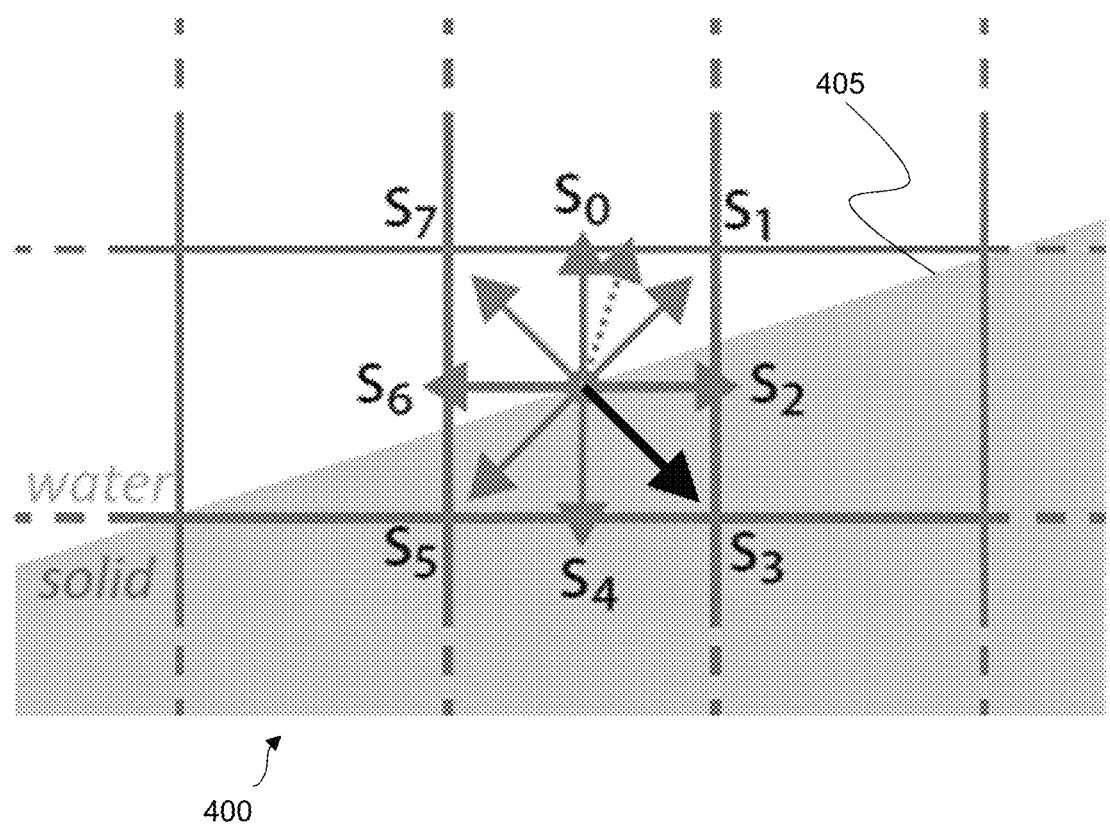
FIG. 4 is a diagram depicting a computer simulation grid for determining reflections of waves off of a boundary between a body of water and a solid object (e.g., an island) according to embodiments of the present invention.

With regard to FIG. 4, another simulation grid 400 is shown depicting reflections bouncing off of a boundary 405 between water and a solid object (e.g., an island) and generated according to embodiments of the present invention. For samples positioned at solid boundaries, for each sample with a direction that points into the solid object, that direction is reflected at the solid boundary, and its value is distributed to the two directions closest to the reflected direction. For example, reflecting a directional sample $S_3$ on the boundary 405 gives the direction of the dotted arrow between $S_0$ and $S_1$. The amplitude of $S_3$ is then redistributed in each time step to the two closest sample directions (e.g., $S_0$ and $S_1$) in accordance with embodiments of the present invention.

General Hybrid Embodiment for Simulating High-Frequency Wave Functions and Complex Environmental Interaction While the above section described specific implementation details for simulating high frequency wave functions in large-scale environments, for example, using Microsoft DirectX 11, this section describes a general hybrid implementation for computer simulating hi-frequency wave functions according to embodiments of the present invention.

It is well-known that PDE-based methods for computer animating water waves excel in the simulation of low-frequency wave functions with complex environmental interactions, and that spectrum-based methods are ideal for computer simulating highly detailed wave functions undergoing simple motion without boundary interactions. Accordingly, embodiments of the present invention utilize a hybrid discretization that relies on discretized PDEs to simulate low frequency motion and uses spectrum-based techniques for simulating the high frequencies. This approach advantageously enables the simulation of very short wavelengths interacting with large-scale, complex environments.

Equation I represents dynamic wave height/elevation/displacement evolution over space and time, as well as wavevectors:

$$\eta(x,t) = \text{Re} \int_{R^2} \mathcal{A}(x,k,t) e^{i(k \cdot x - \omega(k)t)} dk$$

This equation prescribes the wave height η given the amplitude A(x,k,t) at any time t. Therefore, a first order partial differential equation for the evolution of A is provided in Equation II:

$$\frac{\partial \mathcal{A}}{\partial t}(x, k, t) = -\omega'(k)(\hat{k} \cdot \nabla_x) \mathcal{A}(x, k, t)$$

This function represents amplitude function A(x, k, t) advected in space in the direction $\hat{k}$ with speed ω'(k). Equation II is subject to boundary conditions A(x, k, t)= $A_{ambient}$(x, k, t) on transmitting boundary, and A(x, k, t)=A(x, $k_{reflect}$, t) on reflecting boundary, where $A_{ambient}$ is an amplitude function defined outside of the domain, and $k_{reflect}$=k−2(n·k)n is the wavevector reflected off the boundary with a normal n.

Equations I and II are important components used to simulate water waves according to embodiments of the present invention. An interactive wave simulator can advect A through space for each time step using Equation II, and the renderer can then use Equation I to reconstruct the water surface where needed (e.g., in patches). Specifically, A is used to compute the 1D η for each direction (the actual contribution) stored in the profile buffer. In this approach, A acts as the primary simulation variable, while η is used later for reconstruction and visualization. The actual wave height/elevation/displacement η is the contribution of each wave. Specifically, A is updated by the simulation, and then η is computed where necessary by summing together several different waves, using A as the wave amplitude.

Exemplary Discretization of Amplitude Function A

Figure 5:
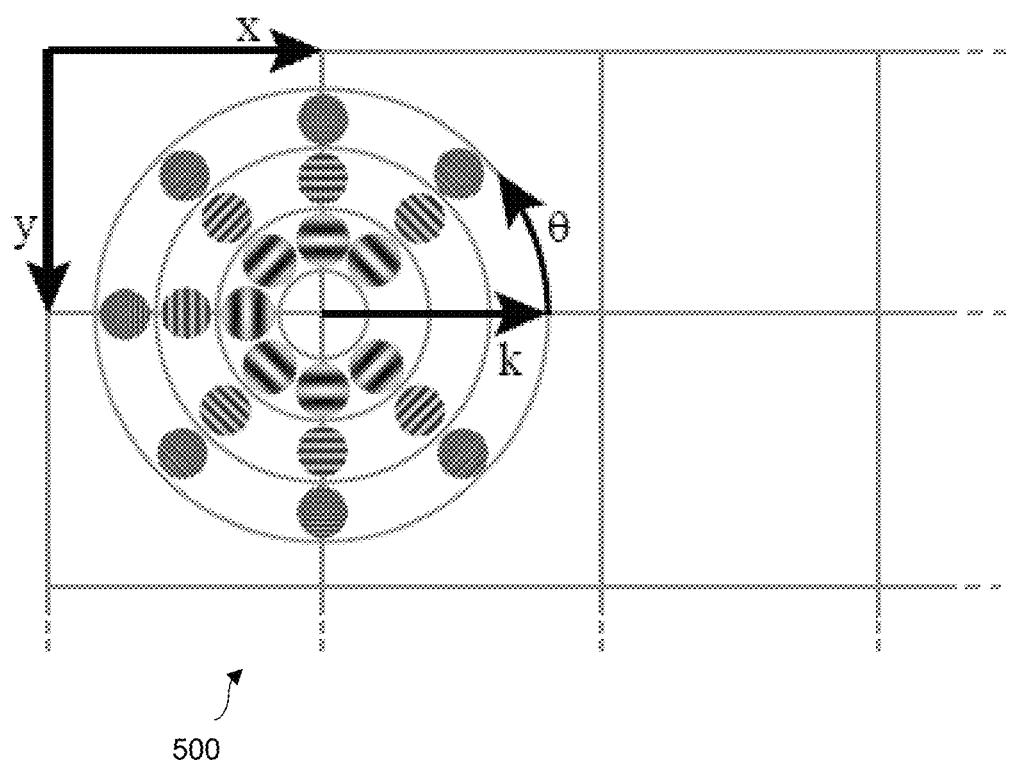
FIG. 5 illustrates an exemplary grid used for discretization of a wave amplitude function within a computer simulation according to embodiments of the present invention.

Embodiments of the present invention represent A on a four-dimensional grid $[x_{min}, x_{max}] \times [y_{min}, y_{max}] \times [0, 2\pi) \times [k_{min}, k_{max}]$, spanning two spatial coordinates x and y, the angular coordinate and the wavevector coordinate k. Samples of A are stored on the nodes in the four-dimensional grid, indexed by the coordinates a, b, c. The notation $A_{abc}$ is used herein to represent a discrete amplitude sample of the wave at grid node position $x_a=(x_a, y_a)$, traveling at angle $\vartheta_b$, with wave number $k_c$. FIG. 5 illustrates another exemplary grid 500 used for discretization of the amplitude function, where each spatial location (x, y) is equipped with a polar coordinate grid (k, ϑ). Coordinates ($x_a$, $y_a$, $\vartheta_b$, $k_c$) are used to store the amplitude of a wavelet at position ($x_a$, $y_a$), angle $\vartheta_b$, and spatial frequency $k_c$ in accordance with embodiments of the present invention.

Accordingly, the amplitude A can be approximated using a linear combination of basis functions in the style of the finite element method:

$$\mathcal{A}(x, k, t) = \sum_{a,b,c} C(\mathcal{A}_{abc}, t) \phi_a(x) \vartheta_b(\theta) \psi_c(k)$$

where $\phi_a(x)$ is a basis function in position, $\theta_c(\vartheta)$ is a basis function in angle, $\psi_c(k)$ is a basis function in wave number coordinates, and $C(A_{abc}, t)$ is a coefficient function weighting various values of $A_{abc}$. For example, piecewise-linear basis functions in all dimensions means that $C(A_{abc})=A_{abc}$, giving the equation:

$$\mathcal{A}(x, k, t) = \sum_{a,b,c} \mathcal{A}_{abc}(t) \phi_a(x) \vartheta_b(\theta) \psi_c(k)$$

The basis functions are simply "hat" functions that weight the nearest values $A_{abc}$. The only practical restriction on the basis functions is that the reconstructed function should actually interpolate the discrete samples $A_{abc}$ to enable operations like semi-Lagrangian advection. In other words, $A(x_a, \vartheta_b, k_c, t)=A_{abc}(t)$. The spatial basis function $\phi_a(x)$ simply interpolates $A_{abc}$ over space using a standard piecewise-linear or piecewise-cubic basis functions. The angular weighting $\theta_b(\vartheta)$ interpolates amplitudes across different traveling directions using piecewise cubic basis functions.

The wave number basis $\psi_c(k)$ has a special physical interpretation; it symbolizes the spectrum of the waves represented by amplitude $A_{abc}$. Any wave spectrum may be assigned to this function. For rendering large-scale interactive waves, according to some embodiments of the present invention, an actual ocean wave spectrum is used for $\psi_c(k)$. For example, $\psi_c(k)$ can be set equal to a directional spectrum and normalized such that $A(x_a, \vartheta b, k_c, t)=A_{abc}(t)$.

Figure 6A:
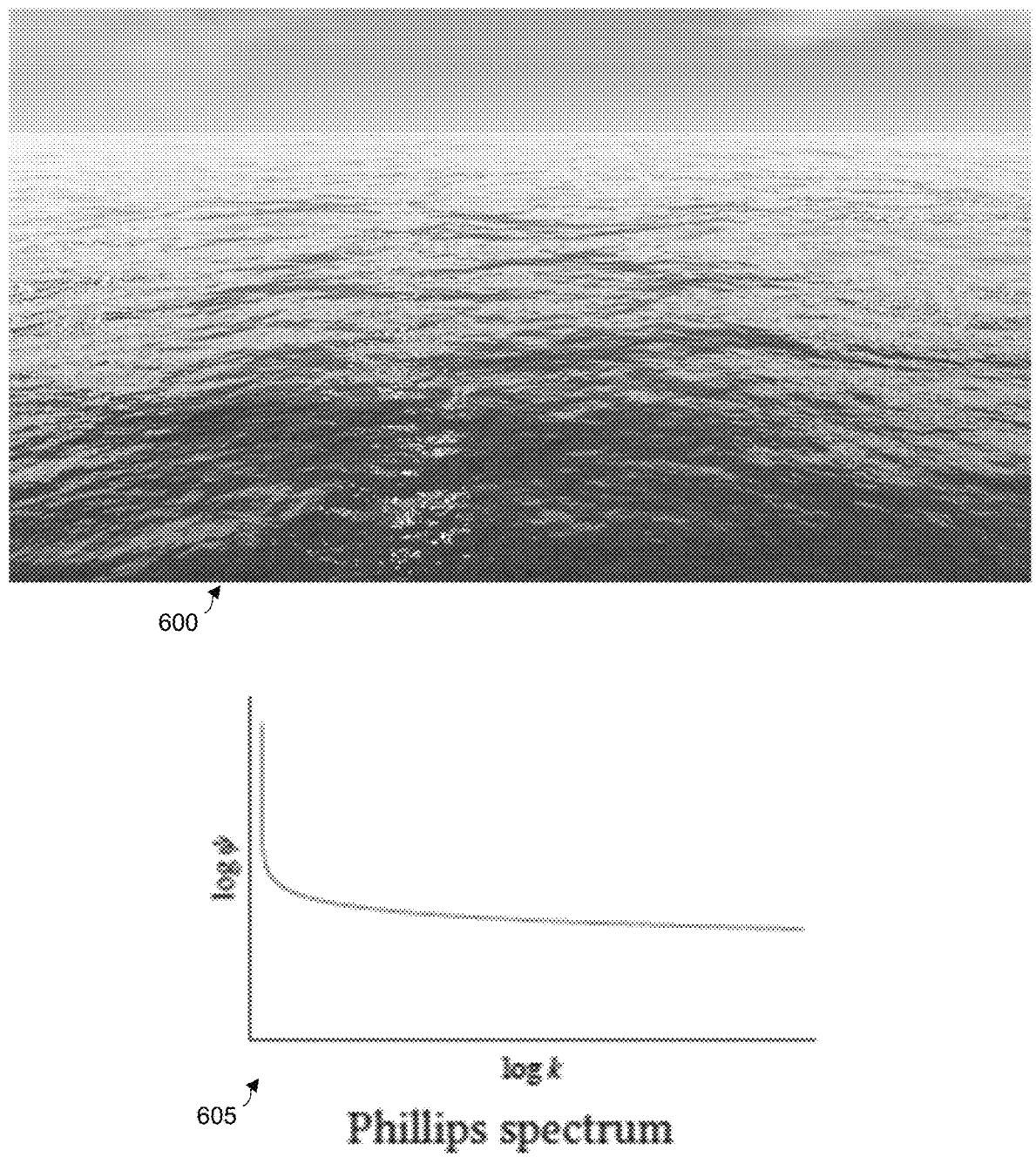
FIG. 6A depicts an exemplary large-scale water simulation scene generated using a wave number basis function according to embodiments of the present invention with associated spectrum chart.
Figure 6B:
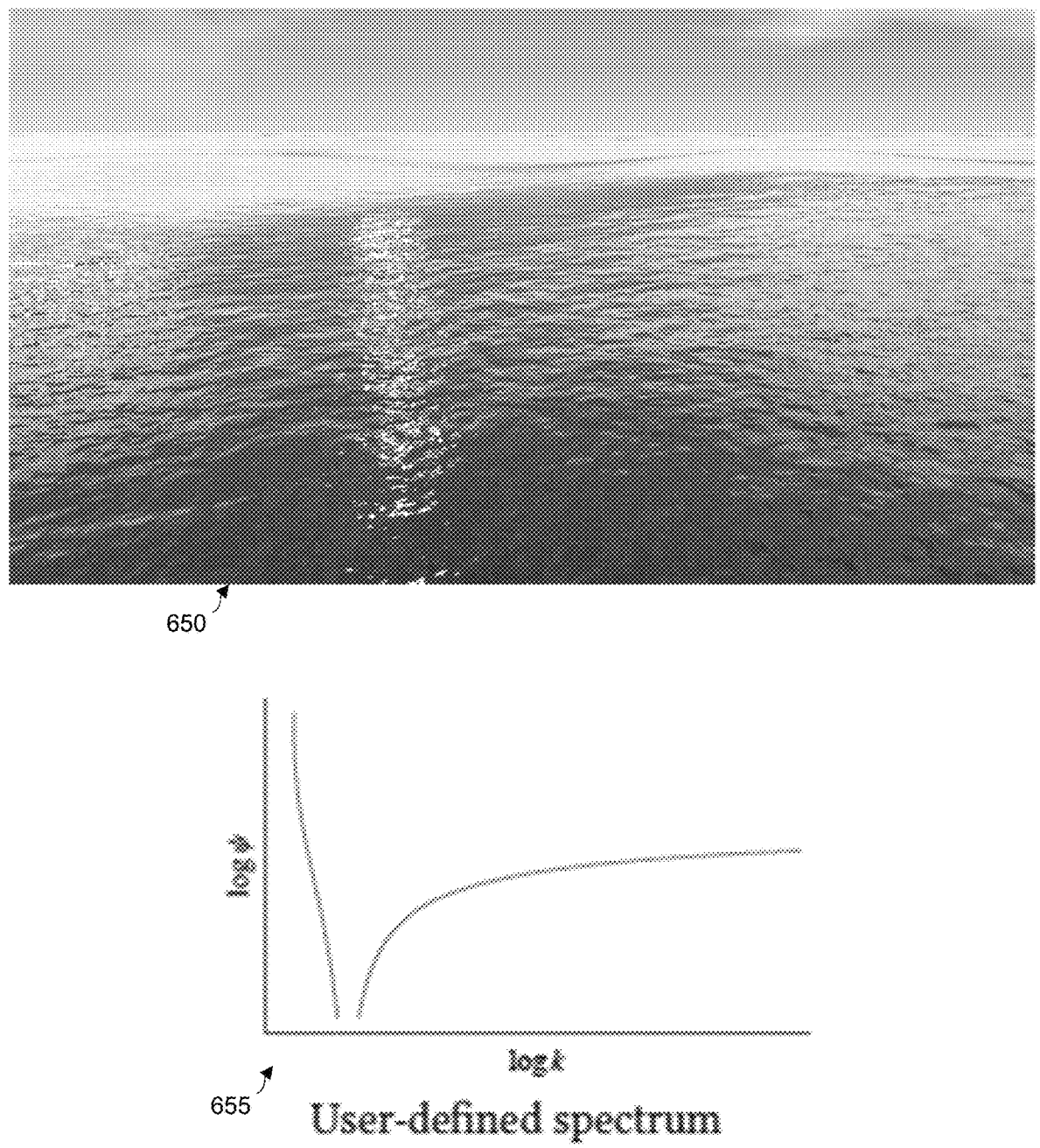
FIG. 6B depicts an exemplary large-scale water simulation scene generated using a wave number basis function set to a user-defined spectrum according to embodiments of the present invention with associated user-defined spectrum chart.

With regard to FIGS. 6A and 6B, exemplary large-scale water simulation scenes 600 and 650 are depicted according to embodiments of the present invention, where the effects of different wave number basis functions on wave height are illustrated for comparison. The basis function ψ(k) controls the wave spectrum which is visualized in the final results. The spectrum can either be determined using different techniques, e.g., using physical equations or tuned using manual values to create a stylized result. FIG. 6A depicts an exemplary large-scale water simulation scene 600 generated using a wave number basis function set to a standard Philips spectrum 605. FIG. 6B depicts an exemplary large-scale water simulation scene 650 generated using a wave number basis function set to a user-defined spectrum 655.

In practice, relatively coarse grids can be used for this discretization. According to some embodiments, greater than $\Theta_A=16$ samples for the wavevector angle do not generally increase the simulation quality. Even fewer samples can be used for discretizing the wave number k. Typically, only $K_A=1$ sample is sufficient to achieve the desired effects. A varies slowly over space, and therefore does not require a high degree of spatial resolution. According to some embodiments, $X_A=4096$ grid cells for each spatial dimension, which defines a grid cell spacing of approximately one meter.

Exemplary Discretization of Advection

When the wavevectors k have been discretized, Equation II becomes a small number of independent scalar advection equations in space—one for each sample of k. The independent equations are numerically integrated in parallel using an unconditionally stable semi-Lagrangian advection with slope-limited cubic spatial interpolation.

$$\mathcal{A}_{abc}(t+\Delta t) = \mathcal{A}_{bc}(x_a - \Delta t \omega'(k_c)\hat{k}_b, t)$$

where $A_{bc}$ is the interpolation of the discretized A with fixed angle $\vartheta_b$ and wave number $k_c$, $\hat{k}$ $b = (\cos \vartheta_b, \sin \vartheta_b)$ is the wave direction determined by angle $\vartheta_b$, and $x_a = (x_a, y_a)$.

When a semi-Lagrangian ray leaves the simulation domain, the relevant boundary condition of Equation II is applied using a different value on the right hand side of the boundary condition. For transmitting boundaries, a procedural $A_{ambient}$ function describes the ambient ocean behavior. For reflecting boundaries, the semi-Lagrangian ray is reflected off of the boundary to obtain a new direction $k_{reflect}$. A is updated with the reflected function value $A(x, k_{reflect}, t)$, as depicted in FIG. 4.

Figure 7:
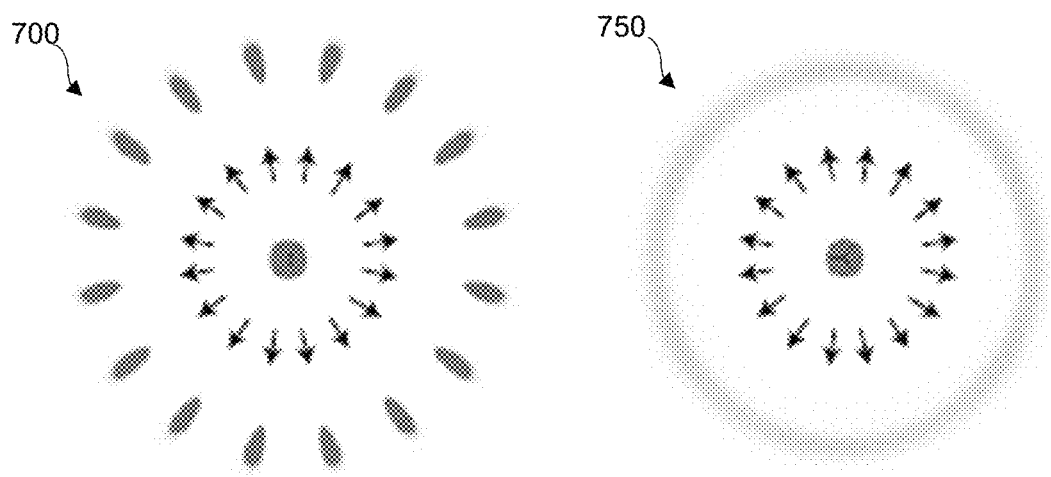
FIG. 7 illustrates exemplary wavefronts radiating from a single point of origin and separating to form individual "blobs" of a computer simulation according to embodiments of the present invention.

As depicted in FIG. 7, over time, amplitudes with different angles $\vartheta_b$ or wave numbers $k_c$ separate from each other, and an ordered initial state can devolve disadvantageously into groups of amplitude "blobs." To address this problem, Equation II is discretized with a finite number of wavevectors, and two diffusion terms are added, resulting in Equation III:

$$\frac{\partial \mathcal{A}}{\partial t} = -\omega'(k)(\hat{k} \cdot \nabla_x)\mathcal{A} + \delta(\hat{k} \cdot \nabla)^2 \mathcal{A} + \gamma \frac{\partial^2 \mathcal{A}}{\partial \theta^2}$$

where δ controls diffusion in the direction of travel, mimicking how wave packets stretch out due to dispersion, and γ controls diffusion in the travel angle, mimicking how wave packets spread out tangentially as they radiate from a source. Other diffusive terms may also be included. FIG. 7 illustrates exemplary wavefronts 700, where the wavefronts 700 radiate from a single point of origin and eventually separate to form individual "blobs." Exemplary group of waves 750 depicts the effect of the angular diffusion terms, which allows the wavefronts to stay connected over time.

Waves can also be suppressed or dampened by adjusting the weight assigned to specific directions. For example, it may be advantageous to suppress waves traveling parallel to a shoreline so that only the approaching and bouncing waves remain. Because suppressing wave directions reduces the overall energy, the final displacements may be normalized using a sum of all weights.

Operator splitting may be used to solve the advection-diffusion equation numerically. The advection is solved by semi-Lagrangian advection as described above, and the diffusion is discretized with second order finite differencing in space and forward Euler in time. For example, the diffusion parameters can be set relative to the advection speed ω', the spatial resolution Δx, the wave number resolution Δk, and the angular resolution $\Delta \vartheta$: $\gamma = 0.025\omega'(k)\Delta \vartheta^2/\Delta x$, and $\delta = 10^{-5}\Delta x^2 \Delta k^2 |\omega''(k)|$.

The effects of wave energy lost due to viscosity (e.g., dissipation) may be reproduced according to embodiments of the present invention by adding the following term to Equation III:

$$\frac{\partial \mathcal{A}}{\partial t} = \ldots - 2vk^2 \mathcal{A} - \frac{1}{2}v\left(\frac{\omega(k)}{2v}\right)^{\frac{1}{2}} k\mathcal{A}$$

where the first term models dissipation due to water viscosity v ($10^{-6}$ m/s) which primarily affects waves with small wavelengths, and the second term accounts for surface contamination such as oil, dirt or algae, which affects larger waves as well.

Height Field Evaluation

The water height may be described in terms of phase as well as local amplitudes in accordance with embodiments of the present invention. The phase of each wavelet in Equation I is determined by $k \cdot x - \omega(k)t$. To translate the entire function in space, $\eta(x, t)$ is replaced with $\eta(x-y, t)$. The formula gains a phase shift of $-k \cdot y$ on the right hand side of the equation. A small shift in space can lead to a large phase shift if k is relatively large. Consequently, although the amplitudes A are well-behaved even on coarse grids, the phases are still sensitive to Nyquist's limit, and therefore require either low frequency waves (small k), or very many samples of k for accurate reconstruction. Alternatively, if particular interference patterns are not required, then aliasing can be avoided by adding a random initial phase shift to each wave:

$$\eta(x,t) = \text{Re} \int_{R^2} \mathcal{A}(x,k,t) e^{i(k \cdot x - \omega(k)t + \xi(k))} dk$$

where ξ is a random number for each wave direction that is fixed throughout time.

To calculate the actual water height, the wave number is evaluated in polar coordinates by plugging in the discretized form of A to arrive at the Equation IV:

$$\eta(x, t) = \int_0^{2\pi} \sum_{a,b,c} C(\mathcal{A}_{abc}, t)\phi_a(x)\vartheta_b(\theta)\Psi_c(\hat{k} \cdot x + \xi(\hat{k}), t) d\theta$$

The function $\psi_c(p, t)$ is precomputed at the beginning of each time step by evaluating it at a number of discrete sample points $p_i$ and storing it in a one-dimensional texture, which is referred to as a "profile buffer" using Equation V:

$$\Psi_c(p,t) = \int_0^\infty \psi_c(k) \cos(kp - \omega(k)t) k \, dk,$$

Equation V treats $\psi_c(k)$ as the amplitude function for each wavelength k in the heightfield evaluation. The pre-computation allows the costly integral evaluation to be advantageously replaced by a simple texture lookup for the remainder of the time step. After the pre-computation, the water height can be evaluated at any point in space by approximating the one-dimensional integral in Equation IV with a summation over several sampled angles. For example, in one exemplary embodiment, $K\eta=400$ wave numbers are summed for the pre-computation in Equation V, and the resulting function $\psi c$ is stored in a one-dimensional texture of size N=4096. $\Theta\eta=120$ angles are summed to evaluate η at each point in space. Note that the number of directions and wave numbers for discretizing A compared to η are largely independent. The exemplary parameters listed in Table 2 were empirically selected based on the quality of the results.

TABLE 2

| Variable | Value | Description |
| --- | --- | --- |
| $K_{\mathscr{A}}$ | 1 | No. of k samples for discretizing $\mathscr{A}$ |
| $K_\eta$ | 400 | No. of k samples for integrating $\eta$ |
| $\Theta_{\mathscr{A}}$ | 16 | No. of $\theta$ samples for discretizing $\mathscr{A}$ |
| $\Theta_\eta$ | 120 | No. of $\theta$ samples for integrating $\eta$ |
| $X_{\mathscr{A}}$ | $4096^2$ | No. of spatial grid samples for discretizing $\mathscr{A}$ |
| N | 4096 | No. of 1D texture samples in profile buffer |

The water height field may also be extended to mimic trochoidal Gerstner waves by computing horizontal displacements in addition to the vertical ones in the profile buffer $\psi c(p, t)$. It is appreciated that these horizontal displacements are then included in the final summation of $\eta$.

The pre-computation of the profile buffer in Equation IV is largely responsible for increasing the performance of the disclosed methods. For comparison, the evaluating $\eta$ at all points in space using the naive 2D integral in Equation 19 costs $O(K_\eta \Theta_\eta X^2_A)$ operations, where $X^2_A$ is the total number of spatial locations where $\eta$ is computed. The speedup from using the profile buffer reduces this computation by two orders of magnitude to $O(K_\eta + \Theta_\eta X^2_A)$. Distributing this computation over G GPU cores reduces the cost further to $O(K_\eta + \Theta_\eta X^2_A/G)$. In practice, the introduction of the profile buffer has been shown to raise the simulation frame rate from 1.8 to 275 (a factor of 233) for evaluating $\eta$, in accordance with one implementation.

Pre-Computing Wave Motions

Figure 8:
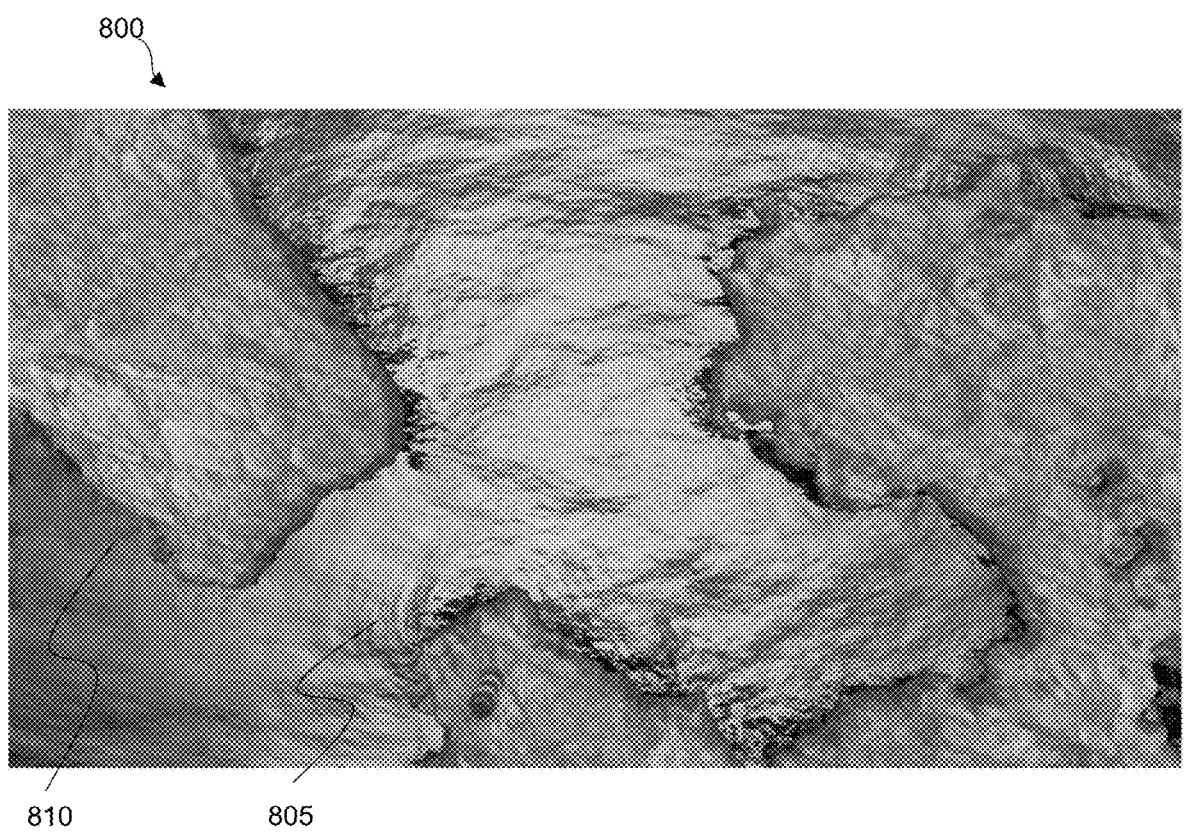
FIG. 8 depicts an exemplary computer animated scene of a large-scale water simulation generated using pre-computed wave motions according to embodiments of the present invention.

Some embodiments of the present invention compute wave motion until the amplitudes reach a steady state, and then store the amplitude functions as static textures. These amplitude textures can then be interpolated at any point in space and then used to efficiently compute wave heights at run-time. This pre-computation of A leads to a considerable speed-up over running the full simulation (e.g., a 4.7× speedup from about 60 fps to about 280 fps over one implementation). FIG. 8 depicts an exemplary animated scene 800 that was generated by a computer simulation using pre-computed wave motions according to embodiments of the present invention. The effects of wind are modeled by adding a source term S(x, k, t) to Equation III. Local wind effects are difficult to model using wavefront tracking methods which require the explicit creation of coherent wavefronts as initial conditions, but they are easy to model for Eulerian methods. As depicted in FIG. 8, the wave amplitudes A in the animated scene 800 are pre-calculated by a wind-driven simulation, but the wave heights n are computed at runtime. It is appreciated that the boundary effects 805 are shown, e.g., where waves reflect and diffract, as well as the shadowing effect 810 is shown where the island blocks the wind.

Solid-Fluid Coupling

Figure 9:
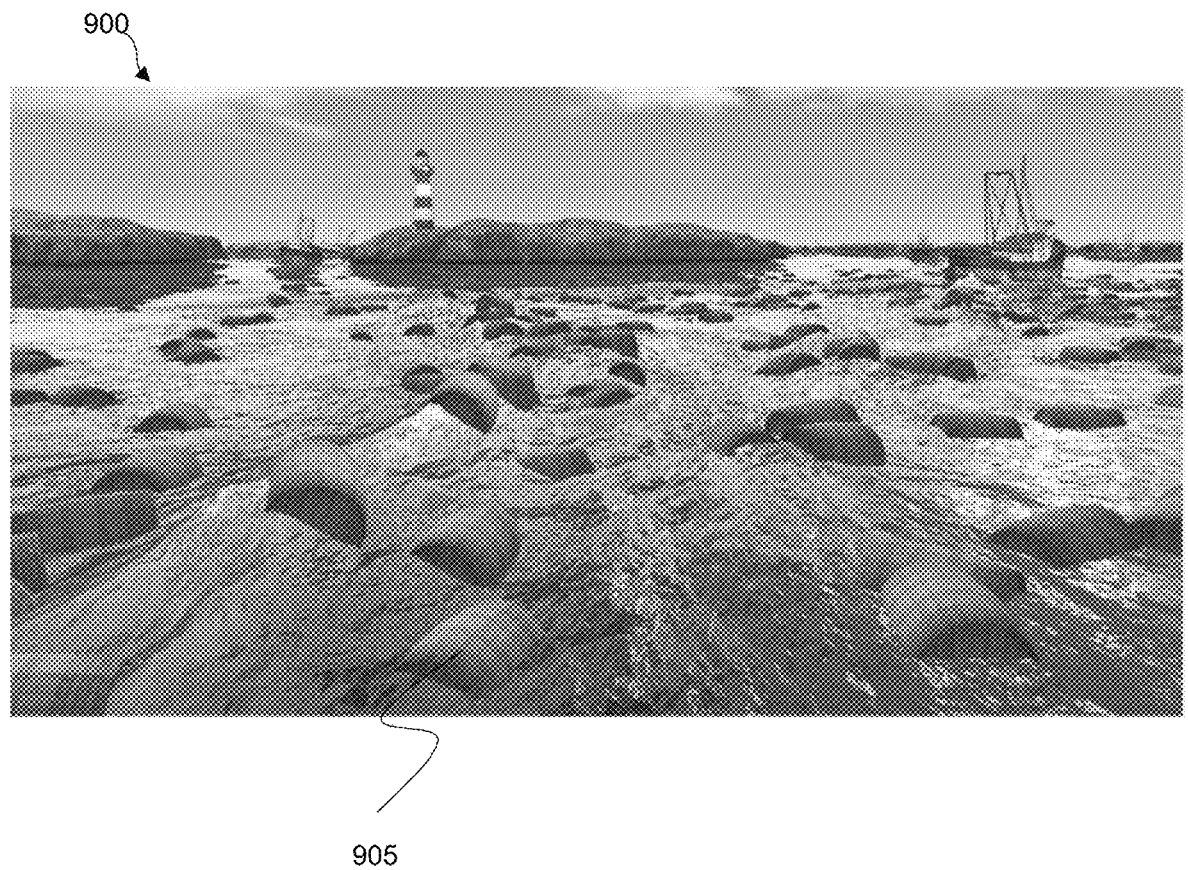
FIG. 9 depicts an exemplary computer animated scene of a large-scale water simulation rendered using solid-fluid coupling techniques according to embodiments of the present invention.

Some embodiments of the present invention introduce elementary coupling between the fluid simulator and rigid bodies. This is accomplished by adding forces to the rigid body from the fluid, and adding waves to the fluid from the rigid body at each time step. FIG. 9 depicts an exemplary animated scene 900 rendered using solid-fluid coupling according to embodiments of the present invention. To allow the waves to influence the rigid bodies, such as floating barrel 905, a buoyancy force is computed by approximating the shape of the submerged volume of the rigid body as a cylinder with volume $V = \pi r^2 (\eta - r - h)$, where r is the radius of the body, and h is the height of its center of mass. The buoyancy force is then $-\rho V g$, where $\rho$ is the density of the fluid and g is the gravity vector. This force is integrated using backward Euler integration to ensure numerical stability.

To add waves to the rigid body simulation, the change in energy of the rigid body caused by the water $\Delta E_{RB}$ is simulated, where the rigid body's energy $E_{RB}$ is equal to $mv^2/2 + mgh$, with body mass m, velocity magnitude v, and gravity magnitude g. Linear wave theory teaches that water wave energy in deep water is proportional to the squared amplitude, and the localized amplitudes are used to confine the wave energy to a region of space:

$$E_{fluid}(x,k,t) \approx \tfrac{1}{2}\rho g (\mathscr{A}(x,k,t))^2$$

To approximately conserve energy, set $\Delta E_{fluid} = -\Delta E_{RB}$. Assuming this change in energy is distributed equally among all wavevectors, the new amplitudes A can be computed at the location of the rigid body $x_{RB}$:

$$\mathscr{A}^{new}(x_{RB}, k, t) \approx \sqrt{\frac{2}{\rho g}\left(E_{fluid}(x_{RB}, k, t) - \frac{\Delta E_{RB}}{K_{\mathscr{A}} \Theta_{\mathscr{A}}}\right)},$$

where the product $K_A \Theta_A$ is the number of discrete wavevectors in the discretization. In this way, rigid body coupling is executed at each time step by adding buoyancy forces to each body, calculating the change in energy of the body, and then converting that change in energy into waves at the location of the rigid body.

Artistic Control Tools

Figure 10:
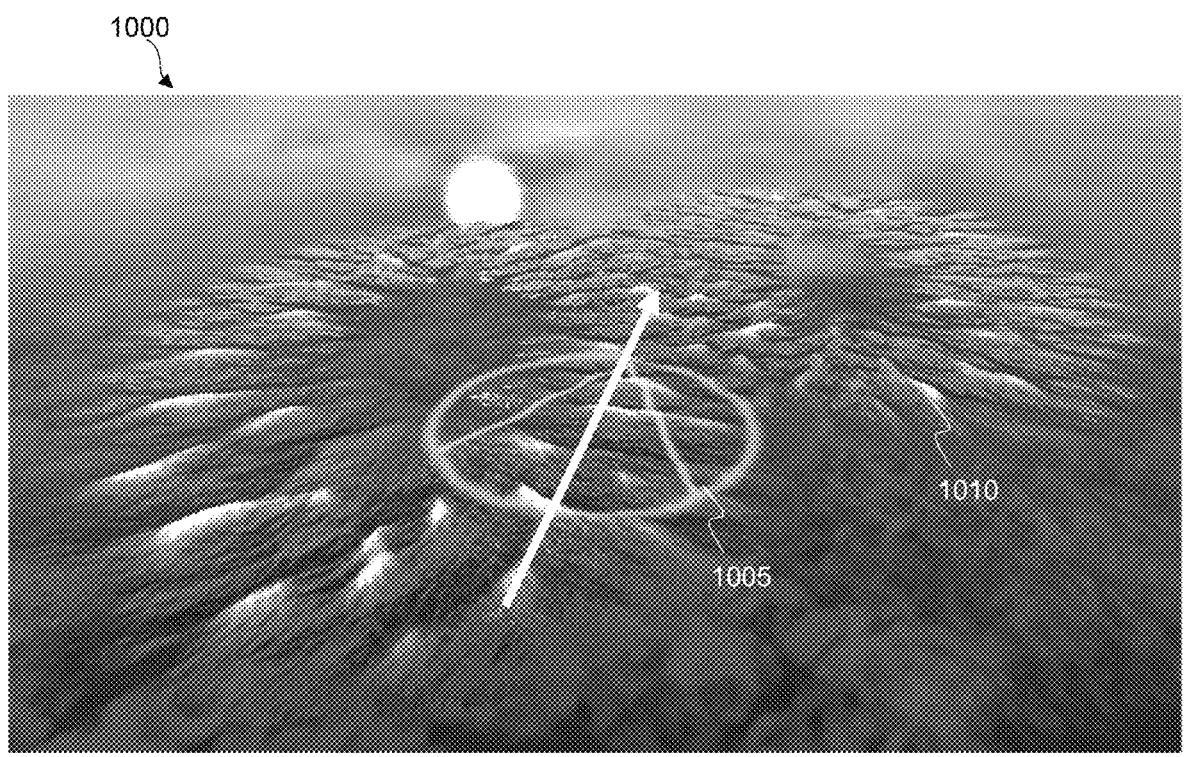
FIG. 10 depicts an animated scene of a large-scale water simulation rendered using an artistic control tool for overriding wave amplitude values by manually creating waves (e.g., increasing wave amplitudes) along an exemplary path according to embodiments of the present invention.

With regard to FIG. 10, an animated scene 1000 of a large-scale water simulation rendered using an artistic control tool 1005 used to override A values with a real-time wave painting interface to manually create waves (e.g., increase wave amplitude values) along an exemplary path is depicted according to embodiments of the present invention. Instead of using physical equations to compute the amplitude textures A, procedural functions can be used to explicitly create or modify the amplitude textures A, for example, using an amplitude-painting interface.

In the example of FIG. 10, the artistic control tool 1005 is manually steered in an infinity ($\infty$) pattern, and the resultant waves 1010 are formed according to the path. According to some embodiments, the amplification factor is based on the distance to an obstacle. It should be appreciated that hand-tuning the amplitudes will be physically incorrect in the sense that the group speeds are set to zero instead of determined by the dispersion relation. However, the phase speeds are still physically correct due to the dispersion relation in Equation IV. The resultant waves individually travel at the correct speed, but wave groups do not. However, this indirect physical inaccuracy is relatively difficult to perceive.

Figure 11:
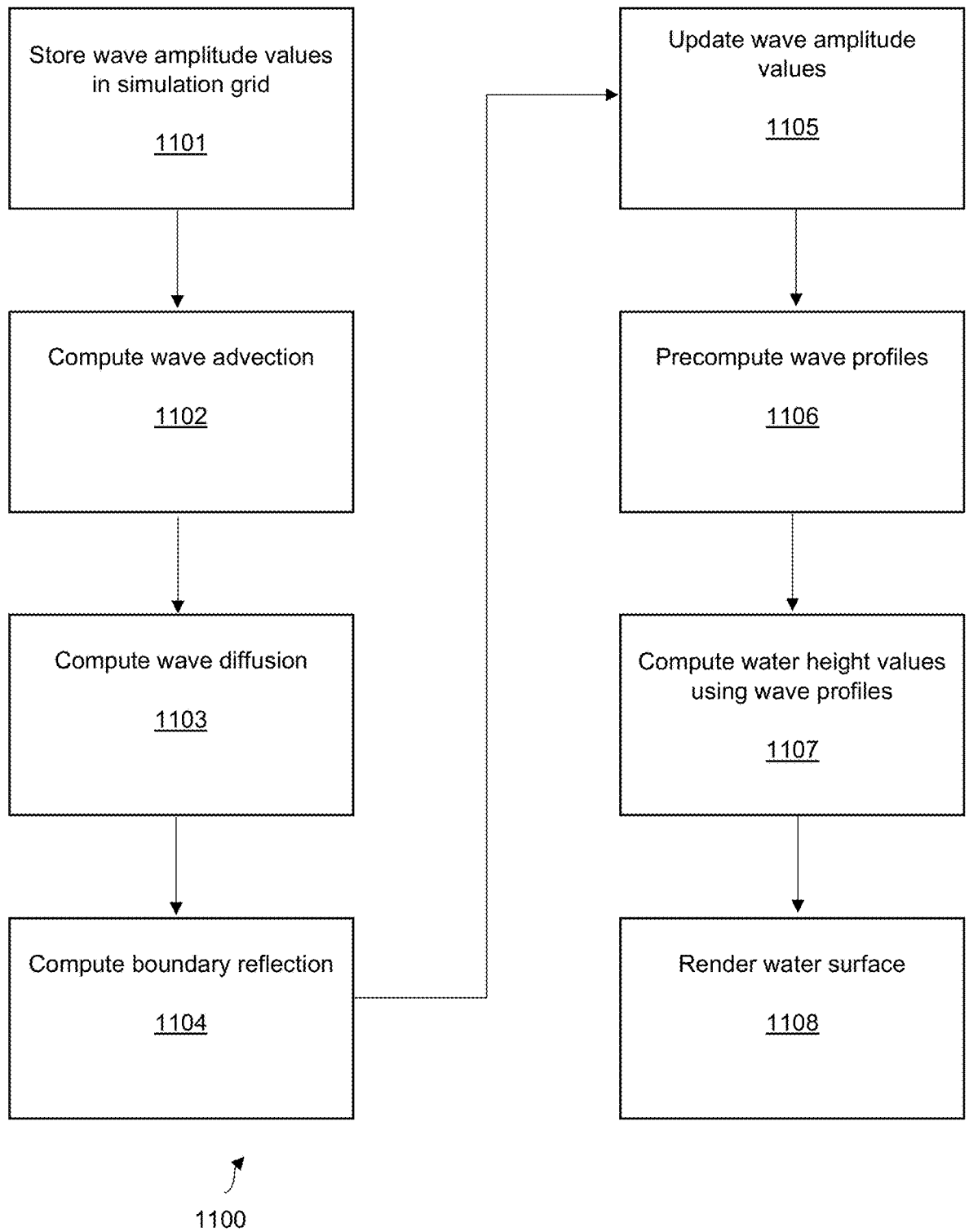
FIG. 11 depicts an exemplary sequence of computer-implemented steps for performing large-scale water simulation accounting for wave advection, wave diffusion, and boundary reflection in accordance with embodiments of the present invention.

Large-Scale Water Simulation Methods in Accordance with Embodiments of the Present Invention FIG. 11, depicts an exemplary sequence of computer-implemented steps 1100 for performing large-scale water simulation in accordance with embodiments of the present invention. At step 1101, initial wave amplitude values $A_{abc}$ are stored in a simulation grid. The simulation grid may be a course simulation grid with one meter grid spacing. As described above, the amplitudes may be calculated as a function of space, frequency, and direction within the simulation grid. At step 1102, wave advection is computed in a plurality of directions. Specifically, each direction is advected in the direction of its corresponding wavevector angle $\vartheta$. Step 1102 may also include computing spatial wave diffusion in one dimension in the direction of the corresponding wavevector angle $\vartheta$, for example, by sampling points along the advection direction using hardware texture sampling with bilinear filtering. This process may be applied for all directions and simulation gridcells in parallel.

At step 1103, angular wave diffusion is computed between neighboring directions of the plurality of directions within each gridcell. The angular wave diffusion is performed to prevent the eventual separation of waves thereby ensuring wavefront connectivity. At step 1104, boundary reflection are computed at a solid boundary of the simulation grid. For each sample with a direction that points into the solid boundary, that direction is reflected back at the solid boundary, and its value is distributed to the two directions closest to the reflected direction.

At step 1105, the wave amplitude values $A_{abc}$ stored in the simulation grid are updated, for example, based on the computed wave advection, wave diffusion, and boundary reflection. At step 1106, wave profiles are precomputed and stored in a wave profile buffer. The profile buffer is a one-dimensional texture $\psi c$ (p, t) used for water height evaluation.

At step 1107, water height values are computed at vertices of a rendering mesh based on the wave profile buffer using Equation IV, for example. The pre-computation allows the costly integral evaluation to be replaced by a simple texture lookup for the remainder of the time step. After the pre-computation, the water height can be evaluated at any point in space by approximating the one-dimensional integral in Equation IV with a summation over several sampled angles. At step 1108, a water surface represented by the coarse simulation grid is rendered in a single shader pass using the water amplitude values stored on the simulation grid. For example, a single DirectX 11 shader pass may be used to render the water surface, and may include rasterizing a tessellated mesh.

Figure 12:
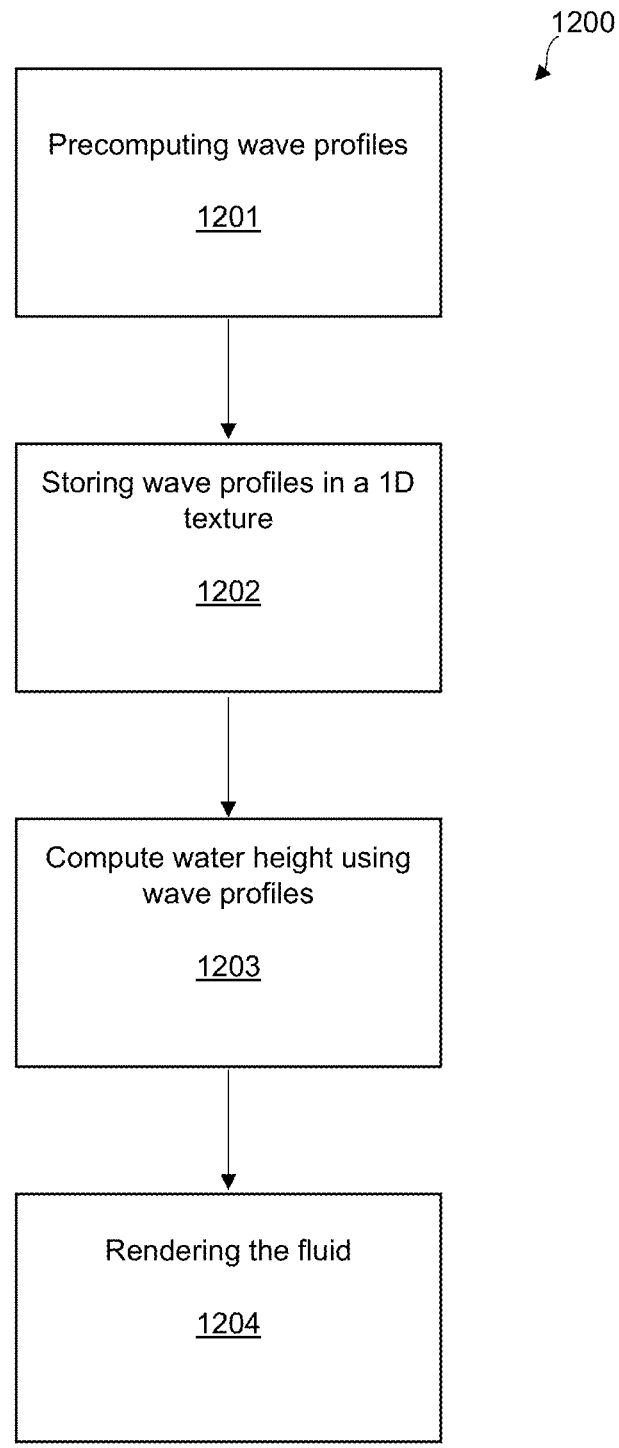
FIG. 12 depicts an exemplary sequence of computer-implemented steps for performing large-scale water simulation using pre-computed profile buffers in accordance with embodiments of the present invention.

FIG. 12 depicts another exemplary sequence of computer-implemented steps 1200 for performing large-scale water simulation in accordance with embodiments of the present invention. At step 1201, wave profiles are precomputed for the plurality of waves by evaluating a wave height function at a plurality of discrete sample points.

At step 1202, the precomputed wave profiles are stored in a one-dimensional texture in computer memory. The pre-computation allows the costly integral evaluation to be replaced by a simple texture lookup for the remainder of the time step. At step 1203, water height values are computed for the fluid using the precomputed wave profiles. For example, the water height can be evaluated at any point in space by approximating the one-dimensional integral in Equation IV with a summation over several sampled angles. At step 1204, the fluid is rendered using the water height values, where the computing, the precomputing, the storing and the rendering are performed by a computer system executing a simulation program.

Exemplary Computer System for Simulating Detailed Waves for Large-Scale Water Simulation Embodiments of the present invention are drawn to method and systems for computer simulation of natural environments, such as ocean waves in real-time with robust visual detail. Computer systems can be used to perform large-scale water simulations with highly-detailed, interactive waves in accordance with embodiments of the present invention. The following discussion describes such an exemplary computer system platform.

Figure 13:
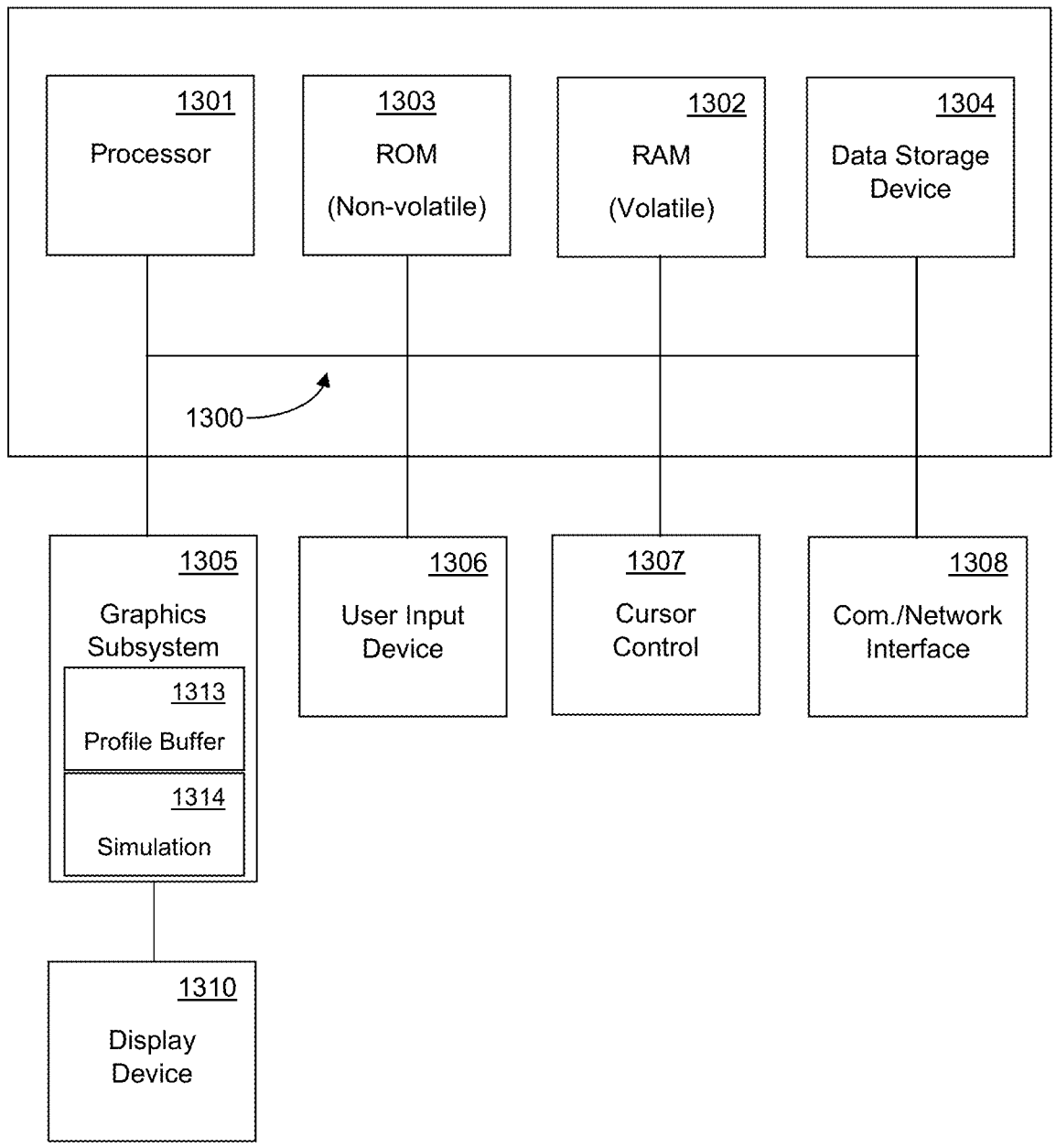
FIG. 13 depicts a block diagram of an exemplary computer system upon which embodiments of the present invention may be implemented to perform large-scale water simulation.

In the example of FIG. 13, computer system 1312 includes a central processing unit (CPU) 1301 for running software applications and optionally an operating system. Random access memory 1302 and read-only memory 1303 store applications and data for use by the CPU 1301. Data storage device 1304 provides non-volatile storage for applications and data and may include fixed disk drives, removable disk drives, flash memory devices, and CD-ROM, DVD-ROM or other optical storage devices. The optional user inputs 1306 and 1307 comprise devices that communicate inputs from one or more users to the computer system 1312 (e.g., mice, joysticks, cameras, touch screens, and/or microphones).

A communication or network interface 1308 allows the computer system 1312 to communicate with other computer systems, networks, or devices via an electronic communications network, including wired and/or wireless communication and including an Intranet or the Internet. The display device 1310 may be any device capable of displaying visual information in response to a signal from the computer system 1312 and may include a flat panel touch sensitive display, for example. The components of the computer system 1312, including the CPU 1301, memory 1302/1303, data storage 1304, user input devices 1306, and graphics subsystem 1305 may be coupled via one or more data buses 1300.

In the embodiment of FIG. 13, a graphics sub-system 1305 may be coupled with the data bus and the components of the computer system 1312. The graphics system comprises a physical graphics processing unit (GPU) and graphics/video memory. A GPU of graphics system 1305 may include one or more rasterizers, transformation engines, and geometry engines, tessellation units, and pixel shaders, and generates pixel data from rendering commands to create output images. The physical GPU can be configured as multiple virtual GPUs that may be used in parallel (e.g., concurrently) by a number of applications or processes executing in parallel, or multiple physical GPUs may be used simultaneously. Graphics sub-system 1305 can output display data to display device 1310.

The graphics sub-system 1305 may be configured to execute instructions of a water simulation application, including generating theoretically accurate wave speeds for surface waves while handling complex interactions with boundaries and objects, as described above. A GPU of graphics system 1305 may be configured to store a one-dimensional texture including pre-computed results of a water height/displacement function evaluated at a number of discrete sample points to increase the performance of wave height/displacement evaluation, as described above. According to some embodiments, the methods for performing large-scale water simulations, as described above, are performed by a graphics processing unit (GPU) of graphics sub-system 1305. In other embodiments, the GPU could also be located remotely to system 1300 and may generate frames remotely and transmit those frames back to system 1300 for display thereof.

The graphics sub-system 1305 includes a profile buffer 1313 used for increasing the execution speed of water height evaluation. For example, water height values may be computed at vertices of the rendering mesh based on the profile buffer 1313 using Equation IV. The pre-computation allows the costly integral evaluation to be replaced by a simple texture lookup for the remainder of the time step. After the pre-computation, the water height can be evaluated at any point in space by approximating the one-dimensional integral in Equation IV with a summation over several sampled angles. According to some embodiments, the profile buffer 1313 includes a one-dimensional, two-component 16-bit texture that stores vertical and horizontal Gerstner wave displacements, computed in a simple pixel shader for each time step.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

What is claimed is:

1. A method of computer implemented simulation of waves of a fluid, the method comprising:
   storing wave amplitude values in a simulation grid;
   computing, using a pixel shader, at least one of:
      wave advection in a plurality of directions according to a wavevector angle;
      wave diffusion between neighboring directions of the plurality of directions; or
      boundary reflection at a solid boundary of the simulation grid;
   based at least in part on at least one of the wave advection, the wave diffusion, or the boundary reflection, updating the wave amplitude values stored in the simulation grid to updated wave amplitude values;
   precomputing wave profiles and storing the wave profiles in a wave profile buffer;
   computing water height values at vertices of a rendering mesh using the wave profile buffer; and
   rendering a water surface using the water height values and the updated wave amplitude values.

2. The method of in claim 1, wherein the computing the at least one of the wave advection, and the wave diffusion, and the boundary reflection are performed in a first shader pass of the pixel shader, and further wherein the precomputing the wave profiles is performed in a second shader pass of the pixel shader for a respective time step.

3. The method of claim 2, wherein the rendering is performed in a single shader pass of the pixel shader.

4. The method of claim 1, wherein the water surface is a bitmap, the wave profile buffer comprises a one-dimensional texture, and the rendering is performed in a single shader pass of the pixel shader.

5. The method of claim 4, wherein the computing the water height values comprises numerically evaluating a water height equation using a weighted sum of the one-dimensional texture representing a plurality of wave angles.

6. The method of claim 1, where the computing the water height values at the vertices of the simulation grid using the wave profile buffer comprises performing a texture lookup operation.

7. The method of claim 1, wherein the computing comprises computing the wave advection and the wave diffusion, further wherein the updating the wave amplitude values, and the computing the wave advection and the wave diffusion, comprises evaluating the formula:

$$\frac{\partial A}{\partial t} = \omega'(k)(\hat{k}\cdot\nabla_x)A + \delta(\hat{k}\cdot\nabla)^2 A + \gamma\frac{\partial^2 A}{\partial\theta^2}.$$

8. The method of claim 1, wherein the computing the water height values comprises evaluating the formula:

$$\eta(x, t) = \int_0^{2\pi} \sum_{a,b,c} C(A_{abc}, t)\phi_a(x)\partial_b(\theta)\Psi_c(\hat{k}\cdot x + \xi(\hat{k}), t)d\theta.$$

9. A computer implemented method of simulating aspects of a fluid in real-time during execution of a simulation program, the method comprising:
   precomputing wave profiles for a plurality of waves by evaluating a water height function at a plurality of discrete sample points of a simulation grid to generate precomputed wave profiles, wherein the fluid comprises a plurality of waves in motion;
   storing the precomputed wave profiles in a one-dimensional texture in computer memory;
   computing water height values for the fluid using the precomputed wave profiles of the one-dimensional texture; and
   rendering, using a pixel shader of a graphics processing unit, a frame depicting a surface of the fluid, the rendering performed using the water height values.

10. The computer implemented method of claim 9, wherein the precomputing comprises computing, using the pixel shader, a wave diffusion process for the plurality of waves based on a direction of travel of a respective wave and a diffusion angle of the respective wave, wherein the wave diffusion process controls an extent to which the wave diffuses over time.

11. The computer implemented method of claim 9, wherein the precomputing comprises computing, using the pixel shader, wave amplitude values using a coarse grid having one meter grid spacing, and wherein the amplitude values are stored in the coarse grid.

12. The computer implemented method of claim 11, wherein the precomputing comprises computing, using the pixel shader, an advection of the wave amplitude values by interpolating wave amplitude values over space using a partial differential equation.

13. The computer implemented method of claim 9, wherein the water height value is computed using on an adaptively refined detailed mesh, and wherein the water height value is calculated for a plurality of nodes and pixels of the adaptively refined detailed mesh.

14. The computer implemented method of claim 9, wherein the precomputing comprises amplifying a set of waves traveling perpendicular to an obstacle, wherein the obstacle is disposed within the fluid, and wherein further a degree of amplification is based on a distance between the object and the set of waves.

15. The computer implemented method of claim 10, wherein the precomputing comprises dampening a set of waves traveling parallel to an obstacle, wherein the obstacle is disposed within the fluid, and wherein a degree of dampening is based on a distance between the object and the set of waves.

16. A system for simulating a fluid, the system comprising:
   a processor configured to execute instructions of an application;

a memory configured to store data of the application; and
a graphics processing unit comprising a pixel shader and configured to execute instructions of the application for performing a method of simulating the fluid, the method comprising:
precomputing wave profiles for a plurality of waves of the fluid by evaluating a water height function at a plurality of discrete sample points of a simulation grid to generate precomputed wave profiles, wherein the precomputed wave profiles comprise a weighted sum of water heights, and wherein the plurality of waves are in motion in accordance with the application;
storing the precomputed wave profiles in a one-dimensional texture in the memory;
computing water height values for the fluid using the precomputed wave profiles of the one-dimension texture; and
rendering a frame comprising a surface of the fluid using the water height values, wherein the rendering is performed in a single pass of the pixel shader.

17. The system of claim 16, wherein the precomputing comprises computing, using the pixel shader, a wave advection and diffusion process for the plurality of waves based on a direction of travel of a respective wave and a diffusion angle of the respective wave, wherein the wave diffusion process controls an extent to which the wave diffuses over time.

18. The system of claim 16, wherein the precomputing wave profiles comprises solving a plurality of discretized partial differential equations, wherein the discretized partial differential equations vary over space and time.

19. The system of claim 16, wherein the precomputing comprises computing wave amplitude values using a coarse grid having one meter grid spacing, and wherein the amplitude values are stored in the coarse grid.

20. The system of claim 19, wherein the precomputing comprises computing, using the pixel shader, an advection of the wave amplitude values by interpolating wave amplitude values over space using a partial differential equation.

21. The system of claim 16, wherein the precomputing comprises amplifying a set of waves traveling perpendicular to an obstacle, wherein the obstacle is disposed within the fluid, and wherein further a degree of amplification is based on a distance between the object and the set of waves.

22. The system of claim 16, wherein the precomputing comprises dampening a set of waves traveling parallel to an obstacle, wherein the obstacle is disposed within the fluid, and wherein a degree of dampening is based on a distance between the object and the set of waves.

* * * * *

UNITED STATES PATENT AND TRADEMARK OFFICE
CERTIFICATE OF CORRECTION

PATENT NO. : 11,010,509 B2  
APPLICATION NO. : 16/107902  
DATED : May 18, 2021  
INVENTOR(S) : Stefan Jeschke et al.

Page 1 of 1

It is certified that error appears in the above-identified patent and that said Letters Patent is hereby corrected as shown below:

On the Title Page

Item (72) Add:  
Tomáš Skřivan, Santa Clara, CA  
Chris Wojtan, Santa Clara, CA

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*